United States Patent
Neumann et al.

[11] 3,760,568
[45] Sept. 25, 1973

[54] OVERHEAD AIR FILTER

[75] Inventors: Gerhard Max Neumann; Hans-Joachim Wittemeier, both of Berlin, Germany

[73] Assignee: Delbag-Luflfilter Gesellschaft mit beschrankter Haftung, Berlin, Germany

[22] Filed: Apr. 24, 1970

[21] Appl. No.: 31,674

[30] Foreign Application Priority Data
Apr. 29, 1969  Germany............... P 19 22 268.5

[52] U.S. Cl.................. 55/473, 55/484, 55/502, 55/504, 55/505, 55/509, 98/40 D
[51] Int. Cl................................................ B01d 27/08
[58] Field of Search............... 55/473, 483, 484, 55/502, 504, 505, 507, 508, DIG. 29; 98/33, 36, 40, 41; 285/368, 64, 177

[56] References Cited
UNITED STATES PATENTS

| | | | |
|---|---|---|---|
| 3,314,353 | 4/1967 | Knab | 98/31 |
| 3,465,666 | 9/1969 | Knab | 98/33 |
| 3,522,724 | 8/1970 | Knab | 55/97 |
| 3,553,941 | 1/1971 | Wittemeier et al. | 55/473 |
| 1,906,826 | 5/1933 | Smith et al. | 285/368 |
| 1,992,503 | 2/1935 | Penick et al. | 285/368 |
| 3,176,447 | 4/1965 | Omohundro et al. | 55/DIG. 29 |
| 3,280,541 | 10/1966 | Soltis | 55/484 |
| 3,308,741 | 3/1967 | Chambers | 98/40 D |
| 3,360,910 | 1/1968 | Soltis | 55/484 |
| 3,376,695 | 4/1968 | Mackley | 55/505 |
| 3,552,104 | 1/1971 | Wood | 55/502 |
| 3,581,478 | 6/1971 | Smith | 55/484 |

*Primary Examiner*—Bernard Nozick
*Attorney*—Karl F. Ross

[57] ABSTRACT

Incoming filtered air is discharged as a uniform downcurrent into a room from an array of horizontal filter units of generally pyramidal shape with a filter cell across the larger end, these units being either fitted individually into or out apertures in a false ceiling by connecting pieces at their apex, or connected side-by-side as a common duct by connecting pieces on their sloping sides.

7 Claims, 9 Drawing Figures

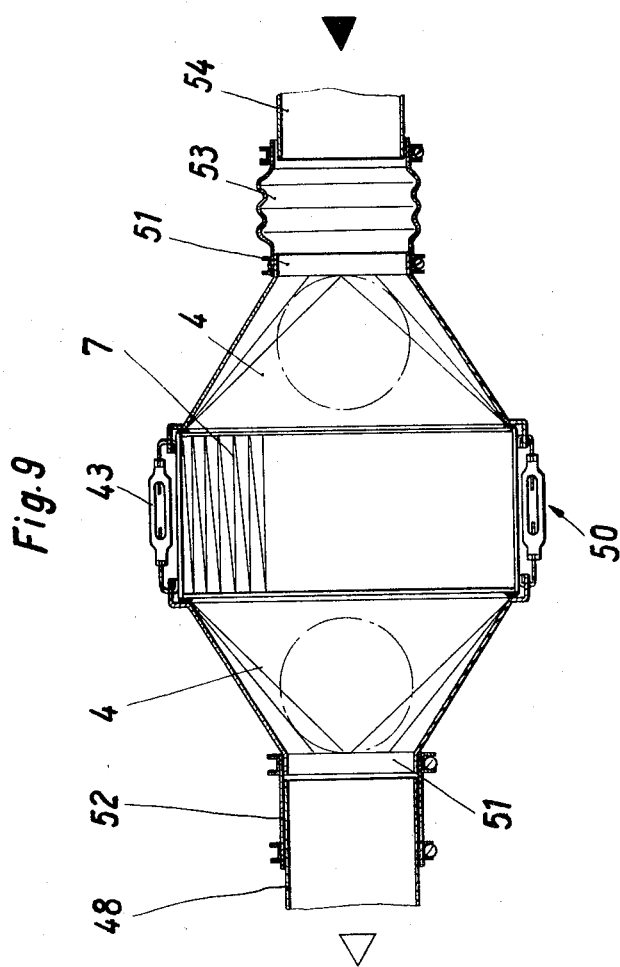

OVERHEAD AIR FILTER

FIELD OF THE INVENTION

This invention relates to filters for separation of suspended material from air or other gas, preferably for ventilation of a room to be kept clean.

BACKGROUND OF THE INVENTION

An earlier commonly assigned and co-pending application Ser. No. 796,832 filed by Hans-Joachim Witemeir and myself on 5 Feb. 1969 (now U.S. Pat. No. 3,553,941 of 12 Jan. 1971) describes an array of filters wherein a transverse or descending air flow is provided. The present invention relates also to the problem of providing such a descending flow with the aid of a horizontal array of overhead filter units, and particularly aims at facilitating the removal of all or part of any filter unit for purposes of replacement.

SUMMARY OF THE INVENTION

In accordance with an important aspect of my present invention, the filter units disclosed in U.S. Pat. No. 3,553,941 are supplied with air in parallel from an overlying plenum chamber whose lower wall is defined by a support for these units, specifically a plate (or a series of interconnected plates) forming a false ceiling below the original ceiling of the room to be aerated. This support is provided with several perforations, one for each unit, aligned with the narrower upper end of the downwardly converging housing of the unit whose broader lower end terminates in a filter cell as described in that patent. The entire unit, or at least its filter cell, is detachably secured to the support by fastening means anchored on the one hand to the support and on the other hand to some part of the unit.

In a preferred embodiment, the upper end of the housing is upwardly extended in the form of a neck clamped by the fastening means, through the intermediary of a deformable sealing element, to a sleeve integral with the lower wall of the plenum chamber, i.e., with the false ceiling referred to above. The neck may have an external peripheral shoulder engaged from below by a pressure member such as a clamping plate; advantageously, this shoulder is constituted by a collar integral with the neck which forms an inner peripheral recess as a seat for the lower end of the sleeve, the sealing element being then in the form of an annular strip resting on that seat. It is, however, also possible to let the neck pass through the sleeve and the perforation; in that case the sealing element may have the form of a cuff with a first portion clamped to the neck and a second portion clamped to the sleeve, the latter portion being folded back in a specific instance around a third portion passing between the neck and the surrounding sleeve. The neck could also be provided with a peripheral bead which clears the surrounding sleeve on being inserted into same from below, the bead then coming to rest on a jointing compound overlying a sealing strip wedged into the intervening space.

DESCRIPTION OF THE DRAWING

The invention will be further described with reference to the accompanying drawing wherein:

FIG. 9 shows an initial filter useful with the embodiment of FIG. 8.

SPECIFIC DESCRIPTION

Figure 1:
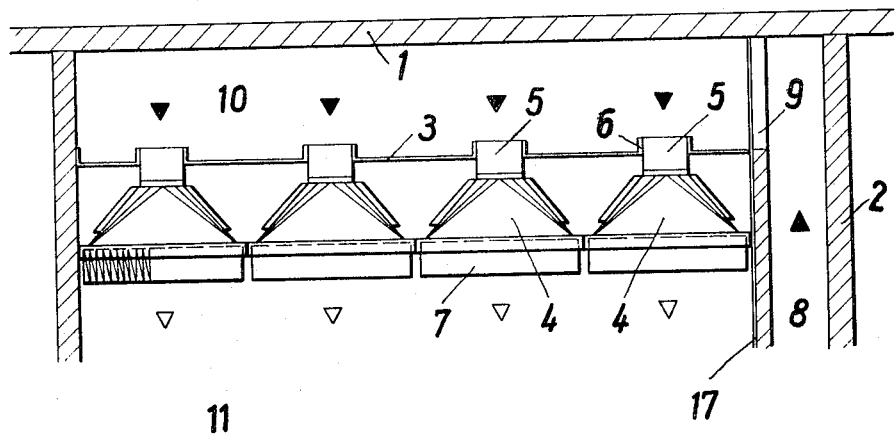
FIG. 1 shows a diagram of a filter array formed in a ceiling by a plurality of housings equipped with filter cells.

As shown in FIG. 1, an intermediate or false ceiling 3 is suspended below the original ceiling 1 of a work room with sidewalls 2. At this intermediate or false ceiling 3 are situated four housings 4 in each of which there is sealingly installed a filter cell 7. In the top of the housing 4 opposite the filter cell 7 there is situated a connecting piece or sleeve 5 which is sealingly received in a perforation 6 of the false ceiling 3. The air which is to be treated is passed by a duct 8 through an opening 9 into a plenum chamber 10 above the false ceiling 3; it then flows through the open connecting pieces 5 into the housings 4 and, after passing through the filter cells 7, into the work room 11 which is to be ventilated.

Figure 2:
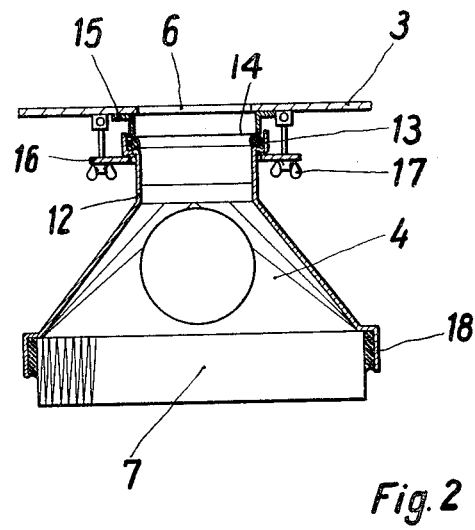
FIG. 2 shows a housing with a sealing and fastening system situated below the ceiling.

A mounting of the connecting piece in the false ceiling 3 is shown in FIG. 2. The housing 4 receiving the filter cell 7 with interpositioning of a seal or gasket 18 possesses a connecting piece or neck 12 which on its extremity is bent outwardly to define an annular collar 13 in which is situated a sealing ring 14 of resilient material. On the underside of the false ceiling 3 is fastened an annular stub or sleeve 15 surrounding the perforation 6; clamping screws 17 are secured to the underside of the false ceiling 3. The connecting piece 12 has a clamping plate 16, engaging under the annular collar 13, which is lifted by tightening the clamping nuts 17 until the sealing ring 14 is in contact under pressure with the lower edge of the annular stub 15. This ensures a hermetic connection of the housing 4 and thus of the filter cell 7 with the plenum chamber 10 situated above the false ceiling 3 (see FIG. 1), from which the flow of gas or air to be treated passes, without infiltrating air into the room 11 which is to be kept clean, through the connecting piece 12, the housing 4 and the filter cell 7. In the embodiment according to FIG. 2, the installation and replacement of the housing 4 can be performed from the work room 11, i.e., from below.

Figure 3:
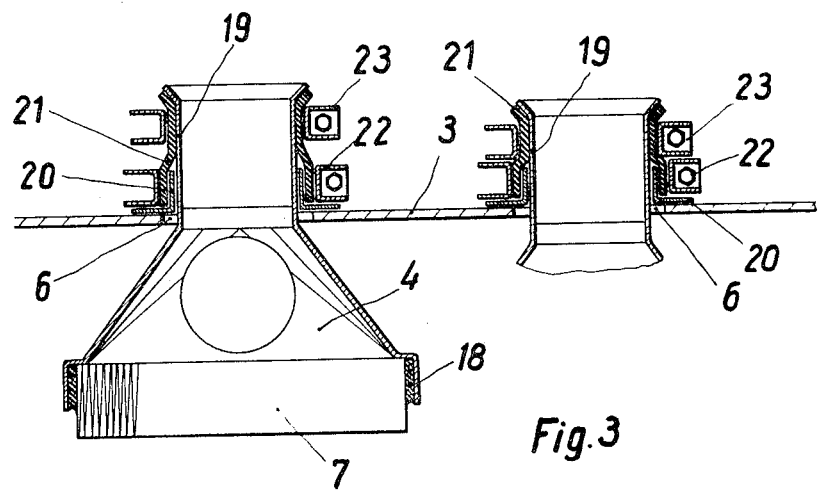
FIG. 3 shows a housing with a sealing and fastening system situated above the ceiling.

FIG. 3 shows a modified embodiment. In this case, the housing 4 carrying the filter cell 7 has a connecting piece or neck 19 which passes through the perforation 6 of the intermediate panel 3 and projects into the plenum chamber 10 thereabove. On the upper side of the intermediate ceiling 3 is fastened a sleeve 20 which carries deformable a sealing cuff or sleeve 21. A bottom clamping ring or clip 22 is provided by means of which the lower extremity of the sealing sleeve 21 is clamped between the clip 22 and the pipe stub or inner sleeve 20. Above the clip 22 I have arranged a second clip 23 which presses the upper extremity of the sealing sleeve against the outer periphery of the connecting piece 19. The clip 23 is pulled down to seat on the lower clip 22 by the weight of the housing 4, so that the housing 4 is held in position. If it becomes necessary to replace the housing 4, the upper clip 23 is removed whereupon the connecting piece 19 with the housing 4 and the filter cell 7 can be pulled out downwardly through the perforation 6 of the false ceiling 3.

Clip 22 embraces a lower portion of cuff 21 to clasp it onto sleeve 20 whereas clip 23 clamps a lower portion of the cuff to neck 19, so that no air can come in directly through the perforation 6.

Figure 4:
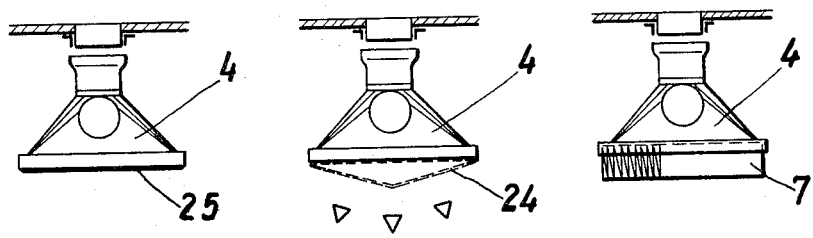
FIG. 4 shows housings equipped with different inserts.

FIG. 4 shows different possibilities in the use of the housing 4 which according to the illustration at the right is equipped with a filter cell 7, according to the illustration in the middle is equipped with a grill insert or anemostat 24 for the purpose of air distribution, and according to the illustration at the left is equipped with a closing shutter 25.

Figure 5:
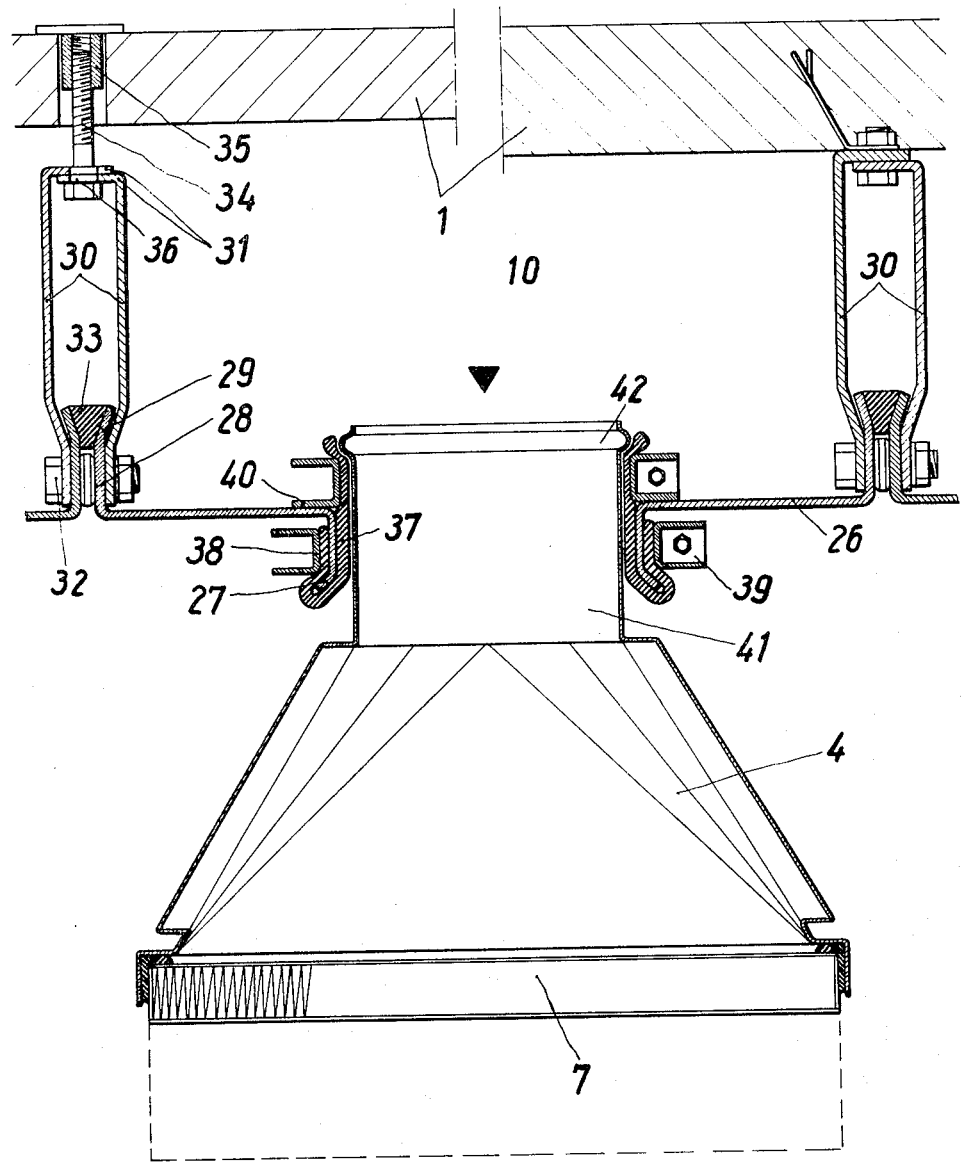
FIG. 5 shows a further embodiment of my improved housing and fastening system and a possible ceiling construction.

In FIG. 5, each filter-cell housing 4 is associated with a supporting unit comprising a carrying plate 26 deformed into a central and downwardly directed annular sleeve 27. In size, the plate 26 corresponds to at least the greatest horizontal cross-sectional area of the filter-cell housing 4. An upwardly bent peripheral flange 28 thereof has an inbent edge 29. When assembled, the carrying plates 26 form an intermediate or false ceiling, the individual plates 26 being interconnected by mountings 30 arranged in the ceiling 1 of the room. Each mounting 30 consists of two generally parallel vertical plates whose short horizontal flanges 31 are bent parallel to the ceiling 1 and overlap one another. The lower edges of the fasteners 30 overlap the flanges or rims 28 of two adjacent plates 26 and interconnect these by means of a sealed fastening screw 32. In order that this joint may be sealed in an airtight manner, a jointing compound 33 is cast between the uppermost edges 29 which jointly define a V-shaped channel. As shown at the right-hand side of FIG. 5, the mountings 30 may be attached to the original ceiling 1 of the room. It is advantageous, however, that the mountings 30 be secured to the ceiling 1 in a vertically and transversely displaceable manner, to allow precise alignment of the individual plates 26 with formation of a horizontal intermediate ceiling. To facilitate this, the ceiling 1 has nuts 35 situated in it; countersunk nuts 35 are engageable from below by bolts 34. These bolts and nuts support the overlapping flanges 31 of the mountings 30, so that the individual mountings 30 are vertically adjustable by appropriately setting the screw bolts 34. To afford transverse displaceability of the mountings 30, elongated slots 36 are provided in the overlapping flanges 31. It is possible in this way, irrespective of the configuration of the ceiling 1, to position the individual plates 26 as a horizontal false ceiling in which the individual carrying plates 26 adjoin one another on all sides.

The peripheral web or sleeve 27 of the plate 26 embraces part of a seal or gasket constituted as a deformable sleeve or cuff 37 whose lower extremity 38 is folded back to overlap the outer surface of the sleeve 27 surrounding an intermediate portion of the cuff. A lower clip 39 bears on the inverted extremity 38 of the sleeve 37 and seals off the annular web 27, so that no infiltrating air can issue from the plenum chamber 10 formed between the ceiling and the plates 26; an upper clip 40 presses the sleeve 37 in fluidtight manner against the connecting piece or neck 41 of the housing. The upper clip 40 simultaneously acts as a mounting for the connecting piece 41 whose upper end has an annular outer bead of increased diameter 42 which prevents a downward displacement of the housing 4.

Figure 6:
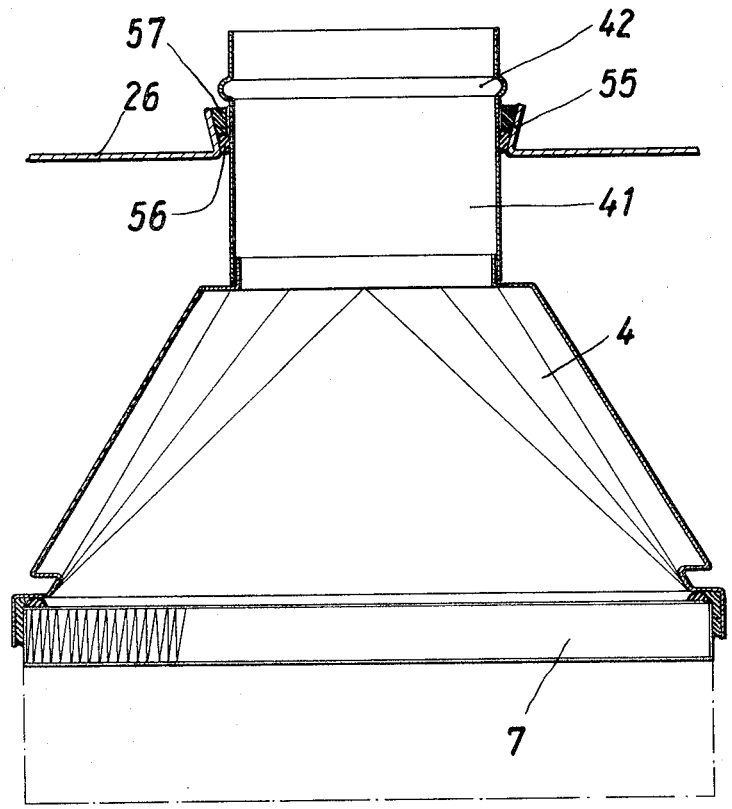
FIG. 6 shows another embodiment of my housing and fastening system.

In FIG. 6 the central perforation of the plate 26 is formed with an integral upwardly directed and conically widening peripheral sleeve 55. The smallest diameter of this sleeve 55 exceeds the outer diameter of the connecting piece or neck 41 of the housing 4 carrying the filter cell 7 so that a resilient deformable sealing ring 56 can be and wedged in between the lower region of the annular sleeve 55 and the connecting piece 41. The funnel-shaped annular clearance situated above the sealing ring 56 is filled with a jointing compound 57 of suitable material which is easily removable. The bead 42 at the end of the connecting piece 41 bears on the mass of joining compound 57. If it is necessary to replace the housing 4, the jointing compound 57 is removed, the sealing ring 56 is withdrawn, and the housing 4 with the connecting piece 41 is pulled out downwardly through the sleeve 55.

Figure 7:
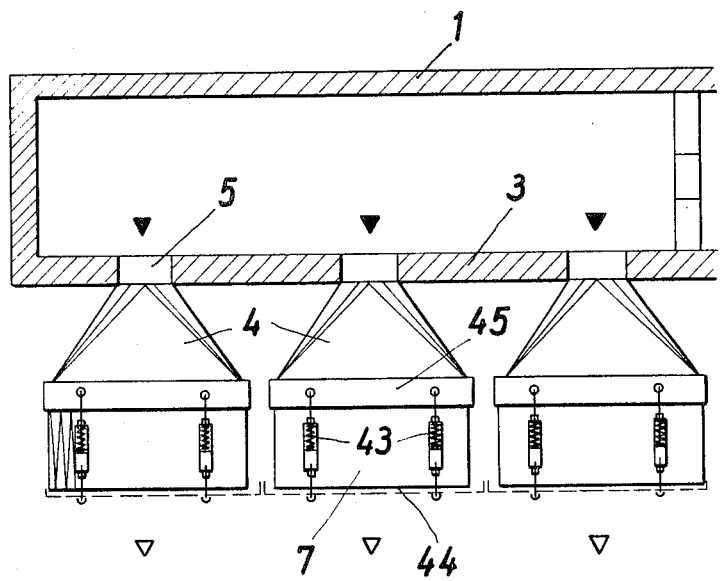
FIG. 7 shows a further feature of the invention.

In the embodiment of FIG. 7, the connecting pieces or necks 5 of the filter-cell housings 4 are firmly received in the false ceiling 3. The filter cells 7 are releasably arranged in their housings 4 by virtue of the fact that they rest on perforated plates 44 whose size corresponds to at least the maximum perimeter of the filter-cell housings 4. The lower edges 45 of the housings 4 are engaged by tie rods or similar elements 43 whose free extremities bear upon the edges of the perforated plates 44. The clamping elements 43 hold the filter cells 7 sealingly in contact with the housings 4, through the perforated plates 44. To replace a filter cell it is only necessary to free the tie rods 43 and to replace the inoperative filter cell by a new one.

Figure 8:
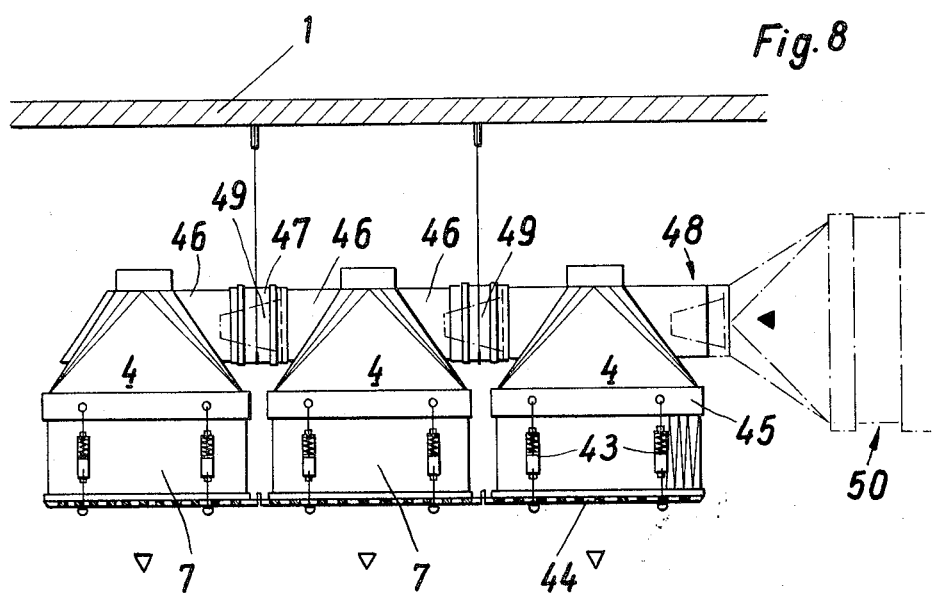
FIG. 8 shows another embodiment of the filter array according to the invention.

In the embodiment according to FIGS. 8 and 9, adjoining filter-cell housings 4 have laterally projecting connecting pieces 46 extending coaxially toward each other. These extend from two sidewalls thereof. The connecting pieces 46 of mutually adjacent housings 4 of a row of housings are firmly and sealingly interconnected by couplings 47 to form a pipe duct or manifold 48. The pipe duct 48 is fastened to the ceiling 1 of the room by means of suspension elements 49, without the need for a false ceiling. The flow of air or gas to be purified is fed to the individual housings 4 of a row of housings, each coupling 47 between any two adjacent housings being provided with a nozzle insert 48 tapering in the direction of flow which ensures a uniform distribution of the air flow in the pipe duct 48 between the individual cell housings 4 and thus between the individual filter cells 7.

As in the form of embodiment according to FIG. 6, the filter cells are held in sealing contact on their individual housings 4 by means of clamping elements 43 acting through perforated plates 44. If it becomes necessary to replace the filter cells, the same procedure is applied as in the embodiment according to FIG. 6.

An input filter 50, which is shown in FIG. 8 and FIG. 9, is situated in the pipe duct 48 at a location upstream of the first filter-cell housing 4. The input filter 50 consists of two symmetrical filter-cell housings 4 equipped with connecting pieces 51. The cell housings 4 enclose between their larger ends a common filter cell 7, held in sealing contact therewith by means of clamping elements 43 (shown as turn-buckles) which overlap the edges of the two housings 4. The connecting piece 51 of one housing 4 is firmly secured to the pipe duct 48 by means of a coupling 52, whereas the connecting piece 51 of the other housing 4 is joined to a duct 54 supplied by a fan, which is not illustrated, by means of bellows 53. If the cell 7 of the input filter 50 is to be replaced, the clamping elements 43 are taken off so that one filter cell housing can be displaced toward the right by utilizing the flexibility of the bellows 53. The filter cell 7 can then be taken out from between the two housings 4 and a new filter cell 7 inserted, whereupon the clamping elements 43 are placed in position again.

The incorporation of an input filter 50, which may for example be constructed as a coarse filter, is advantageous in that it extends the service life of the filter cells 7 whereby their replacement need only be undertaken at longer intervals.

I claim:
1. An assembly for admitting filtered air to a room having a ceiling, comprising:
   an overhead support underneath said ceiling forming a lower wall of a plenum chamber connected to a supply of air under pressure, said wall being provided with a perforation bounded by a depending sleeve;
   a unit provided with a downwardly diverging housing terminating in a filter cell at its broader lower end, said housing being provided at its narrower upper end with an upwardly extending neck of substantially the same inner diameter as said sleeve, said neck widening at its top into a collar embracing said sleeve; and
   a plurality of fasteners depending from said wall and carrying clamping means releasably engaging a peripheral shoulder on the underside of said collar for detachably suspending said unit from said support with establishment of a flow path from said plenum chamber through said filter cell, said neck and said collar forming an airtight seal between said wall and said housing.
2. An assembly as defined in claim 1 wherein said clamping means includes a pressure member surrounding said neck and bearing from below upon said shoulder.
3. An assembly as defined in claim 1, further comprising a sealing strip clamped between said sleeve and said collar.
4. An assembly as defined in claim 1 wherein said wall forms part of a false ceiling paralleling the ceiling of the room and defining said plenum chamber therewith.
5. An assembly for admitting filtered air to a room having an original ceiling, comprising:
   a false ceiling paralleling said original ceiling and defining therewith a plenum chamber connected with a supply of air under pressure, said false ceiling being provided with a plurality of perforations each bounded by a depending sleeve;
   a plurality of units, one for each perforation, provided with a downwardly diverging housing terminating in a filter cell at its broader lower end, said housing being provided at its narrower upper end with an upwardly extending neck aligned with and of substantially the same inner diameter as a respective sleeve depending from said false ceiling, said neck widening at its top into a collar embracing the aligned sleeve; and
   individual fastening means for each unit anchored to said false ceiling and releasably engaging a peripheral shoulder on the underside of the collar of the respective unit for enabling detachment of any unit from said false ceiling.
6. An assembly as defined in claim 5, further comprising a deformable sealing element overlying said collar at its junction with said sleeve, said fastening means clamping said neck and said sleeve under pressure against said element.
7. An assembly as defined in claim 6 wherein said fastening means include a pressure member surrounding said neck while bearing upon said shoulder from below and bolts depending from said false ceiling in clamping engagement with said pressure member.

* * * * *